United States Patent
Le Dissez et al.

(10) Patent No.: US 9,188,755 B2
(45) Date of Patent: Nov. 17, 2015

(54) MICROBUNDLE OPTICAL CABLE

(75) Inventors: Arnaud Le Dissez, Milan (IT); Enrico Consonni, Milan (IT); Marco Ruzzier, Milan (IT)

(73) Assignee: PRYSMIAN S.P.A., Milan (IT)

( * ) Notice: Subject to any disclaimer, the term of this patent is extended or adjusted under 35 U.S.C. 154(b) by 0 days.

(21) Appl. No.: 13/515,659

(22) PCT Filed: Dec. 23, 2009

(86) PCT No.: PCT/EP2009/067872
§ 371 (c)(1),
(2), (4) Date: Aug. 14, 2012

(87) PCT Pub. No.: WO2011/076279
PCT Pub. Date: Jun. 30, 2011

(65) Prior Publication Data
US 2012/0301092 A1  Nov. 29, 2012

(51) Int. Cl.
*G02B 6/00* (2006.01)
*G02B 6/44* (2006.01)

(52) U.S. Cl.
CPC ............... *G02B 6/441* (2013.01); *G02B 6/4403* (2013.01); *G02B 6/4433* (2013.01)

(58) Field of Classification Search
CPC .... G02B 6/4403; G02B 6/448; G02B 6/4411; G02B 6/4404; G02B 6/4482; G02B 6/3608
USPC ................ 385/114, 14; 439/488; 65/412, 433
See application file for complete search history.

(56) References Cited

U.S. PATENT DOCUMENTS

| | | | | |
|---|---|---|---|---|
| 4,695,128 A | * | 9/1987 | Zimmerman et al. | 385/111 |
| 5,212,756 A | * | 5/1993 | Eoll | 385/114 |
| 5,878,180 A | * | 3/1999 | Nothofer et al. | 385/114 |
| 5,978,536 A | * | 11/1999 | Brandi et al. | 385/102 |
| 6,041,153 A | * | 3/2000 | Yang | 385/109 |
| 6,067,394 A | * | 5/2000 | Ruello et al. | 385/106 |
| 6,185,352 B1 | * | 2/2001 | Hurley | 385/114 |
| 6,226,431 B1 | * | 5/2001 | Brown et al. | 385/114 |
| 6,501,889 B1 | * | 12/2002 | Griffioen et al. | 385/114 |
| 6,636,673 B2 | * | 10/2003 | Register et al. | 385/105 |
| 6,731,844 B2 | * | 5/2004 | Conrad et al. | 385/114 |
| 7,536,071 B2 |   | 5/2009 | Pavan et al. | |
| 2002/0076179 A1 | * | 6/2002 | Hardwick et al. | 385/114 |

(Continued)

FOREIGN PATENT DOCUMENTS

EP  0 829 742 A1  3/1998
FR  2 509 480 A1  1/1983

OTHER PUBLICATIONS

International Search Report from the European Patent Office in International Application No. PCT/EP2009/067872 mailed Jun. 8, 2010.

*Primary Examiner* — Kaveh Kianni
(74) *Attorney, Agent, or Firm* — Finnegan, Henderson, Farabow, Garrett & Dunner, L.L.P.

(57) ABSTRACT

A microbundle optical cable such as, a riser cable, includes an outer jacket and a plurality of microbundles housed in the outer jacket. At least one of the microbundles includes an optical fiber ribbon enclosed in a microbundle coating. The at least one microbundle includes a longitudinal axis and a cross-section taken on a plane substantially perpendicular to the longitudinal axis. The cross-section may include a first dimension and a second dimension. The first dimension is higher than the second dimension. Therefore, the cross-section shape is an elongated cross shape.

10 Claims, 1 Drawing Sheet

(56) References Cited

U.S. PATENT DOCUMENTS

| | | | |
|---|---|---|---|
| 2002/0154873 A1* | 10/2002 | Sheu | 385/114 |
| 2002/0186939 A1* | 12/2002 | Rutterman et al. | 385/103 |
| 2002/0197032 A1* | 12/2002 | Conrad et al. | 385/114 |
| 2003/0161596 A1* | 8/2003 | Register et al. | 385/106 |
| 2004/0146255 A1* | 7/2004 | Ishikawa et al. | 385/114 |
| 2008/0253729 A1* | 10/2008 | Gronvall et al. | 385/137 |
| 2009/0190890 A1* | 7/2009 | Freeland et al. | 385/111 |
| 2010/0232753 A1* | 9/2010 | Parris et al. | 385/109 |

* cited by examiner

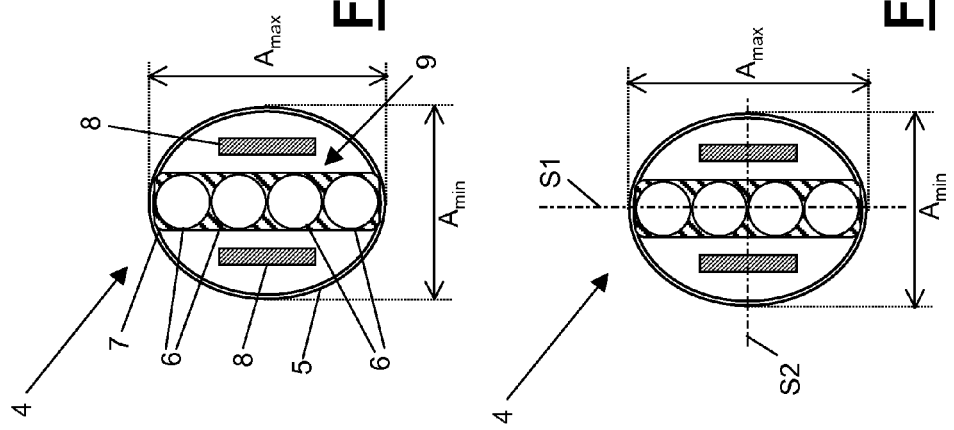

MICROBUNDLE OPTICAL CABLE

CROSS REFERENCE TO RELATED APPLICATION

This application is a national phase application based on PCT/EP2009/067872, filed Dec. 23, 2009, the content of which is incorporated herein by reference.

TECHNICAL FIELD

The present invention relates to the field of optical cables. In particular, the present invention relates to an optical cable comprising a plurality of microbundles.

BACKGROUND ART

In the field of optical communication networks, the expression "Fiber-to-the-x" ("FTTx") is used to denote a network architecture making use of optical fibers. In particular, the expression "Fiber-To-The-Premises" ("FTTP") denotes the portion of the optical communication network that reaches the premises (home, offices and the like) of the end customer. The expression "Fiber-To-The-Home" ("FTTH") denotes the portion of the optical communication network that reaches the home of the end customer.

A FTTH network is an optical communication network providing a number of end customers with broadband communication services, i.e. with services requiring data transmission at a rate of more than a few Mbit/s.

Typically, a FTTH network comprises a distribution cabinet cooperating with a transport network, a plurality of termination boxes and a plurality of optical fibers. Each termination box is connected to the distribution cabinet by means of one or more optical fibers.

Typically, a distribution cabinet is located in the basement of a building, in which building the end customers reside, whereas termination boxes are arranged at the various building floors, within or in proximity of the apartments and/or offices of the end customers.

An optical cable comprising a plurality of optical fibers typically exits the distribution cabinet. In the following of the present description, an optical cable which exits a distribution cabinet and serves each floor of a given building to reach each end customer will be indicated as "in-line optical cable" or "riser cable".

FTTH installations are largely characterized by the presence of multi-dwelling units (MDUs). Such units may comprise up to several tens of potential customers who are concentrated onto a relatively small area and are typically distributed in a vertical dimension.

Therefore, typically, the in-line optical cable runs through the building from the basement up to all the building floors. The in-line optical cable is typically laid down within a conduit, which protects the in-line optical cable.

In new buildings such conduits are generally empty and fully available for the passage of such rising cables. On the contrary, in existing buildings the conduits are generally at least partially occupied and it may be difficult to perform installation. In any case, the riser cable may be typically subject to bends when it is installed in both new and existing conduits.

Typically, an optical cable, which comprises one or more optical fibers, exits each termination box installed at an end customer's apartment/office of the building. An optical cable which exits a termination box is typically indicated as "drop cable".

Connecting the distribution cabinet to a termination box requires extracting at least one in-line optical fiber from the in-line optical cable and connecting such an in-line optical fiber to a drop optical fiber of said drop cable exiting the termination box. The optical connection between the in-line optical cable and the drop cable is typically made in a so-called "optical transition box".

The Applicant has faced the problem of providing an optical cable, in particular an optical riser cable, which has a relatively reduced outer diameter while has a high fiber count and which can be more easily bent in order to install it in conduits, either existing conduits or new conduits. It should be remarked that providing an optical cable having a relatively reduced outer diameter and a high number of optical fibers are conflicting requirements.

The Applicant has also faced the problem of providing such a riser optical cable having an optical fiber modularity, namely a fiber optical cable wherein all the optical fibers are arranged into several groups, with each group of optical fibers comprising one or more optical fibers. Typically, each group of optical fibers comprises the same number of optical fibers. Each group of optical fibers could be advantageously dedicated to a single customer. Indeed, providing a plurality of optical fibers to a single customer is becoming a requirement of national telecom authorities which want to offer more competition among telecommunication providers. This because each single optical fiber reaching the premise of a customer can be used by a different telecommunication provider. After the installation of the optical cable the only operation required to a customer in order to change provider is to switch to the appropriate fiber.

Several optical cables are known in the art.

For instance, U.S. Pat. No. 6,185,352 discloses a fiber optic fan-out cable having optical sub-units. The optical sub-units are disposed about a central member, at least some of the optical sub-units each respectively comprising a sub-unit jacket, strength fibers, and at least one respective optical fiber ribbon therein. The optical fiber ribbon including a plurality of optical fibers, the strength fibers generally surrounding and contacting the optical fiber ribbon within the sub-unit jacket. A cable jacket surrounds the central member and defines an annular space wherein the optical fiber sub-units are disposed about the central member. The annular space including essentially no strength fibers therein outside of the sub-unit jackets, the strength fibers being essentially located within the optical sub-unit jacket with the respective optical fiber ribbons. One or more layers of optical sub-units, that can be bundled with a conventional binder tape or cord, are preferably helically (unidirectionally) or SZ stranded about the central member in the annular space. Cable jacket has an outside diameter of about 8 mm to about 30 mm, as determined by the number of sub-units that are in the particular cable. The number of sub-units in a cable may vary from, for example, 3 to 36.

U.S. Pat. No. 7,536,071 discloses an optical cable for communication including at least one micromodule, wherein the micromodule is blocked with respect to the propagation of water. The at least one micromodule comprises a plurality of optical fibers, for example a bundle of optical fibers, includes at least one optical fiber, a retaining element for housing the at least one optical fiber, and a thixotropic filling compound arranged within the retaining element. The micromodule comprises a plurality of optical fibers, for example a bundle of optical fibers. The plurality of optical fibers is housed within the retaining element in a loose manner.

U.S. Pat. No. 6,067,394 discloses a modular optical transmission cable which has several reinforcement and optical modules, each optical module having: a sheathed optical fiber, coated with: an intermediate decoupling layer, and with a rigid shell forming a microcarrier, a reinforcement module being associated with an optical module, the modules being molded in an external sheath. A flexible reinforcement module is associated with at least one optical module that is self-reinforced against compression in order to obtain a cable having high flexibility combined with high compressive strength. The disclosure can be applied in the field of optical fiber cables and especially that of the reinforcement structures of such cables and fibers.

No one of the cables disclosed in the above cited prior art provides the desirable requirements in terms of reduced diameter, high fiber counts, optical fiber modularity and high capability to be bent for being installed in conduits, either existing conduits or new conduits.

All requirements are particularly desirable when the optical fiber cable is used for installing an FTTP or FTTX network.

SUMMARY OF THE INVENTION

According to the present invention it has been found an optical cable comprising a plurality of microbundles loosely housed in an outer jacket, in which at least one microbundle comprises an optical fiber ribbon enclosed in a coating and has an elongated cross-section with an ellipticity ratio of between 0.5 and 1.

By elongated cross-section we mean a cross section having two orthogonal axis, in which the dimension in the direction of one axis differs from the dimension in the direction of the second axis.

By microbundle ellipticity we mean the ratio between the dimensions taken along two orthogonal axis, one of which is oriented in the direction of the main dimension of the microbundle.

By optical fiber ribbon we mean a structure having at least two optical fibers arranged in mutual planar configuration and surrounded by an external common matrix.

Preferably, said microbundle comprises at least a strength member.

Said microbundle ellipticity enables movement and/or rotation of said at least one microbundle within the outer jacket, thus arranging its position when the cable is bent and avoiding microbundles packing.

The Applicant has found that a microbundle having an ellipticity less than 0.5 is subject to packing with others microbundles. This packing compromises the ability of extracting a selected microbundle by pulling it from an end or an opening of the cable and decreases the ability to bend the cable. In the present description and claims the expression "cable filling ratio" (CFR) is meant the ratio between the area occupied by the microbundles and the internal area of the optical cable. All the areas (of the microbundles and cable) are cross-section areas. The area occupied by the microbundles is the sum of cross-section areas of microbundle coatings, calculated at the outer surface of said coatings. When all the microbundles have the same size and characteristics, the area occupied by microbundles is the area of a single microbundle, multiplied by the number of microbundles in the optical fiber cable. The internal area of the cable is the area, calculated at the inner surface of the outer jacket. Such area is the area which is available for housing microbundles.

Preferably the cable filling ratio (CFR) is between 0.25 and 0.55. This enables ease of extraction and the economy of the cable construction.

According to a first aspect, the present invention provides an optical cable, which comprises: an outer jacket and a plurality of microbundles housed in the outer jacket, wherein at least one of said microbundles comprises an optical fiber ribbon enclosed in a microbundle coating, wherein a cross-section taken on a plane substantially perpendicular to the longitudinal axis of the microbundle comprises a first dimension and a second dimension, the first dimension being higher than the second dimension.

In one embodiment the optical cable is a riser cable. Preferably, such a cross-section shape is symmetrical with respect to at least one first plane passing through the longitudinal axis. More preferably, such a cross-section shape is also symmetrical with respect to a second plane, perpendicular to the first plane and also passing through the longitudinal axis.

In one embodiment, the microbundle coating has a substantially elliptical cross-section.

The microbundle coating comprises a minimum axis and a maximum axis, wherein a ratio, ME, between said minimum axis and said maximum axis is $0.5 \leq ME < 1.0$.

In other embodiments, the ratio, ME, between the minimum axis and the maximum axis is of between 0.6 and 0.9.

In still other embodiments, the ratio, ME, between the minimum axis and the maximum axis is of between 0.6 and 0.8.

Preferably the optical fiber ribbon enclosed in the microbundle coating comprises at least two optical fibers.

More preferably the optical fiber ribbon enclosed in the microbundle coating may advantageously comprise four optical fibers.

The at least one microbundle may further comprise at least one strength member.

In one advantageous embodiment, the strength members of the microbundle are two and are arranged at opposite sides with respect to said optical fibers. Each of said strength members may be an aramidic yarn with proper yarn count Preferably, the plurality of microbundles is loosely housed in the outer jacket.

The cable filling ratio is preferably of between 0.25 and 0.55.

A lubricant may be arranged on an external surface of said microbundle coating and/or on the internal surface of the outer jacket.

The cable may further comprise outer jacket strength rods within the thickness of the outer jacket.

BRIEF DESCRIPTION OF THE DRAWINGS

The present invention will become fully clear by reading the following detailed description, given by way of example and not of limitation, to be read by referring to the accompanying drawings, wherein:

FIG. 1 is a schematic cross section of an optical cable according to an embodiment of the present invention;

FIG. 2 is an enlarged schematic view of a microbundle of FIG. 1; and

FIG. 3 shows the microbundle of FIG. 2, its longitudinal axis and symmetry planes.

DETAILED DESCRIPTION OF PREFERRED EMBODIMENTS OF THE INVENTION

FIG. 1 is a schematic cross section of an optical cable 1 according to an embodiment of the present invention. Optical cable 1 comprises an outer jacket 2 and a number of microbundles 4. In FIG. 1, the number of microbundles 4 is twelve. However, this is only an example because the cable 1 can comprise, in principle, any number of microbundles 4, either higher than twelve or lower than twelve. Preferably, the microbundles 4 are arranged in the outer jacket 2 in a loose manner. Therefore, some space is provided between the microbundles 4 so that they can move one with respect to the other and also with respect to the outer jacket 2.

Friction between two microbundles and between a microbundle 4 and the outer jacket 2 should be kept as low as possible, in order to improve microbundle extractability and to prevent unwanted displacement of microbundles due to dragging originated by the jacket. In order to keep friction as low as possible, suitable lubricants such as talcum and/or other lubricants may be advantageously used.

The outer jacket 2 may be advantageously made of LSOH (Low Smoke Zero Halogen) materials, or in case no specific fire safety requirements have to be fulfilled it may also be made of LDPE, MDPE, HDPE (respectively Low, Medium and High Density Polyethylene). Advantageously, the outer jacket 2 can have a thickness of between about 1.5 mm and about 4.0 mm. More preferably, the outer jacket 2 can have a thickness of between about 2.0 mm and about 3.0 mm.

As shown in FIG. 1, in the thickness of the outer jacket 2 there are preferably provided two strength rods 3. Such strength rods 3 may be made of Glass-Reinforced Polymer (GRP) or similar composite materials. Preferably they are arranged diametrically opposed one from the other.

Each of the microbundles 4 of the cable of FIG. 1 may have different size and/or characteristics. However, preferably, all the microbundles 4 have the same size and characteristics.

With reference to FIG. 2, each of the microbundles 4 comprises a microbundle coating 5 and a plurality of optical fibers 6. Optical fibers 6 within a microbundle 4 may be two or more. In the embodiment shown in the Figures, the optical fibers 6 of each microbundle 4 are four. The number of optical fibers 6 in each microbundle 4 represents a "dose" of optical fibers 6 which can be provided to a single customer.

Optical fibers 6 may be of any known type. For instance, they may be compliant with any of the IEC standards or else with any of the ITU-T Recommendations, or others as (e.g. 200 μm) coating diameter.

Preferably, as shown in FIGS. 1 and 2, the optical fibers 6 in the microbundle coating 5 are arranged in a ribbon configuration. For the purposes of the present description and claims, an optical fiber ribbon 9 is meant to be comprised by at least two optical fibers 6 arranged in mutual planar configuration (parallel and laying in a common plane). In such a ribbon arrangement the optical fibers 6 are surrounded by an external common sheath or matrix 7, preferably of a polymeric material.

The optical fibers 6 of an optical fiber ribbon 9, advantageously, can be spliced at the same time by using anyone of the commercially available ribbon splicers. This results in an improved modular splice management which brings high cost benefits in cable installations.

The microbundle coating 5 preferably comprises a very thin and easy-strippable thermoplastic sheath in order to guarantee easy accessibility to the optical fibers of the microbundle. The thickness of the microbundle coating 5 may be of about 0.05 mm to about 0.20 mm.

At least one microbundle of the plurality of microbundles 4 comprises at least one strength member 8. Preferably, each of the microbundles 4 comprises at least one strength member 8. Preferably, there are provided two strength members 8 on opposite sides of the optical fiber ribbon 9 as shown in the figures. Each of said strength members 8 may be an aramidic yarn with proper yarn count (e.g. 1310 dTex).

The cross-section shape of microbundle 4 is elongated, for instance elliptical, substantially elliptical, egg-shaped or the like. With reference to FIG. 3, such a cross-section shape is symmetrical with respect to at least one first plane S1 passing through the longitudinal axis LA, such a cross-section shape is also symmetrical with respect to a second plane S2, perpendicular to the first plane S1 and also passing through the longitudinal axis LA. The cross-section of microbundle 4 comprises a first dimension and a second dimension. The first dimension is higher than the second dimension. With reference to FIG. 3 again, the first dimension is indicated by $A_{max}$ and the second dimension is indicated by $A_{min}$.

In one preferred embodiment the cross-section is substantially elliptical with a maximum axis $A_{max}$ and a minimum axis $A_{min}$. For the purposes of the present description and claims, a rate between the minimum axis and the maximum axis will be termed as microbundle ellipticity (ME). According to preferred embodiments of the present invention, the microbundle ellipticity ME should be $0.5 \leq ME < 1.0$. In embodiments of the present invention, the microbundle ellipticity ME is of between about 0.6 and about 0.9. In other embodiments, the microbundle ellipticity ME is of between about 0.6 and about 0.8. The above microbundle strength members 8 on opposite sides of the optical fiber ribbon 9 advantageously contribute to give the desired microbundle ellipticity ME.

The above microbundle ellipticity ME allows minimizing the dimension of a single microbundle.

At the same time, it is desirable that the microbundle ellipticity ME is not too low in order to avoid coupling of the microbundles within the outer jacket. In addition, if the microbundle ellipticity ME is too low, bending the cable may become difficult and it may become difficult also extracting the fibers from the cable.

From one side, the cable filling ratio should be kept as low as possible in order to minimize the mechanical coupling among microbundles 4 and between the microbundles 4 and the outer jacket 2. From another side, the cable filling ratio needs to be high enough to allow for the needed fiber density. According to embodiments of the present invention the cable filling ratio is between 0.25 and 0.55. Preferably, the cable filling ratio is between 0.30 and 0.50. More preferably, the cable filling ratio is between 0.35 and 0.45.

In order to minimize the cable filling ratio but still keeping a desired low outer cable diameter and the desired high fiber count, the thicknesses of both the outer jacket and of the microbundle coating need to be minimized.

For instance, a cable complying with the set requirements may have the following characteristics:
  cable outer diameter: 17.0 mm
  outer jacket thickness: 2.5 mm
  internal cable area: 113.0 mm$^2$
  microbundle coating thickness: 0.2 mm
  number of microbundles: 36
  microbundle ellipticity: 0.7
  microbundle maximum axis: 1.4 mm
  microbundle area: 1.1 mm$^2$
  total microbundle area: 39 mm$^2$
  cable filling ratio: 0.35

The optical cable according to the present invention shows a very good behavior under bending and provides improved resistance to mechanical damages. Therefore, installation into existing conduits which are often at least partially occupied and are not optimized for optical cable installation becomes possible. The improved behavior under bending and improved resistance to mechanical damages are obtained because the microbundles 4 containing the optical fibers can arrange themselves in order to accommodate the cable bend. In other words, when the cable according to the present invention is subject to a bend, the microbundles having an elongated cross-section, which are preferably loosely arranged in the outer jacket and which house ribbon optical fibers, arrange their orientation in order to create a preferential bending plane which is compliant with the required bending.

As a consequence of the above capability to properly arrange orientation of the microbundles, the cable according to the present invention also shows a lower attenuation with respect to existing microbundle cables.

The accessibility to both microbundles and optical fibers within a few meters before and after a bend is increased in the cable according to the present invention. This mainly because the microbundles are preferably arranged in a loose manner within the outer jacket. A further positive consequence of the loose arrangement of microbundles within the outer jacket is that the ability to extract a microbundle from the cable is increased.

The invention claimed is:

1. A microbundle optical cable comprising:
   an outer jacket defining an open cross-sectional area for housing microbundles; and
   a plurality of microbundles loosely housed in the cross-sectional area of said outer jacket so the microbundles can move one with respect to the other and also with respect to the outer jacket,
   wherein at least one of said microbundles comprises an optical fiber ribbon and two strength members enclosed in a microbundle coating, wherein the strength members are arranged at opposite sides with respect to said optical fibers,
   wherein said at least one microbundle comprises a longitudinal axis and a cross-section taken on a plane substantially perpendicular to said longitudinal axis, wherein the cross-section comprises a first dimension ($A_{max}$) and a second dimension ($A_{min}$), and
   wherein said first dimension ($A_{max}$) is longer than said second dimension ($A_{min}$).

2. The optical cable of claim 1, wherein said microbundle coating has an elongated cross-section.

3. The optical cable of claim 2, wherein said microbundle coating comprises a minimum axis ($A_{min}$) and a maximum axis ($A_{max}$), wherein a ratio, ME, between said minimum axis ($A_{min}$) and said maximum axis ($A_{max}$) is $0.5 \leq ME \leq 1.0$.

4. The optical cable of claim 3, wherein said ratio, ME, between said minimum axis ($A_{min}$) and said maximum axis ($A_{max}$) is between 0.6 and 0.9.

5. The optical cable of claim 1, wherein said optical fiber ribbon enclosed in said microbundle coating comprises two optical fibers surrounded by an external common matrix.

6. The optical cable of claim 1, wherein said optical fiber ribbon enclosed in said microbundle coating comprises four optical fibers surrounded by an external common matrix.

7. The optical cable of claim 1, wherein each of said two strength members comprises an aramidic yarn.

8. The optical cable of claim 1, comprising a cable filling ratio between 0.25 and 0.55.

9. The optical cable of claim 1, further comprising a lubricant on an external surface of said microbundle coating.

10. The optical cable of claim 1, further comprising outer jacket strength rods within a thickness of said outer jacket.

* * * * *